3,203,156
CARBON BLACK COLLECTING SYSTEMS
James D. McGregor and Alain A. Osgood, Borger, Tex., assignors to J. M. Huber Corporation, Locust, N.J., a corporation of New Jersey
Filed Feb. 5, 1962, Ser. No. 171,057
3 Claims. (Cl. 55—223)

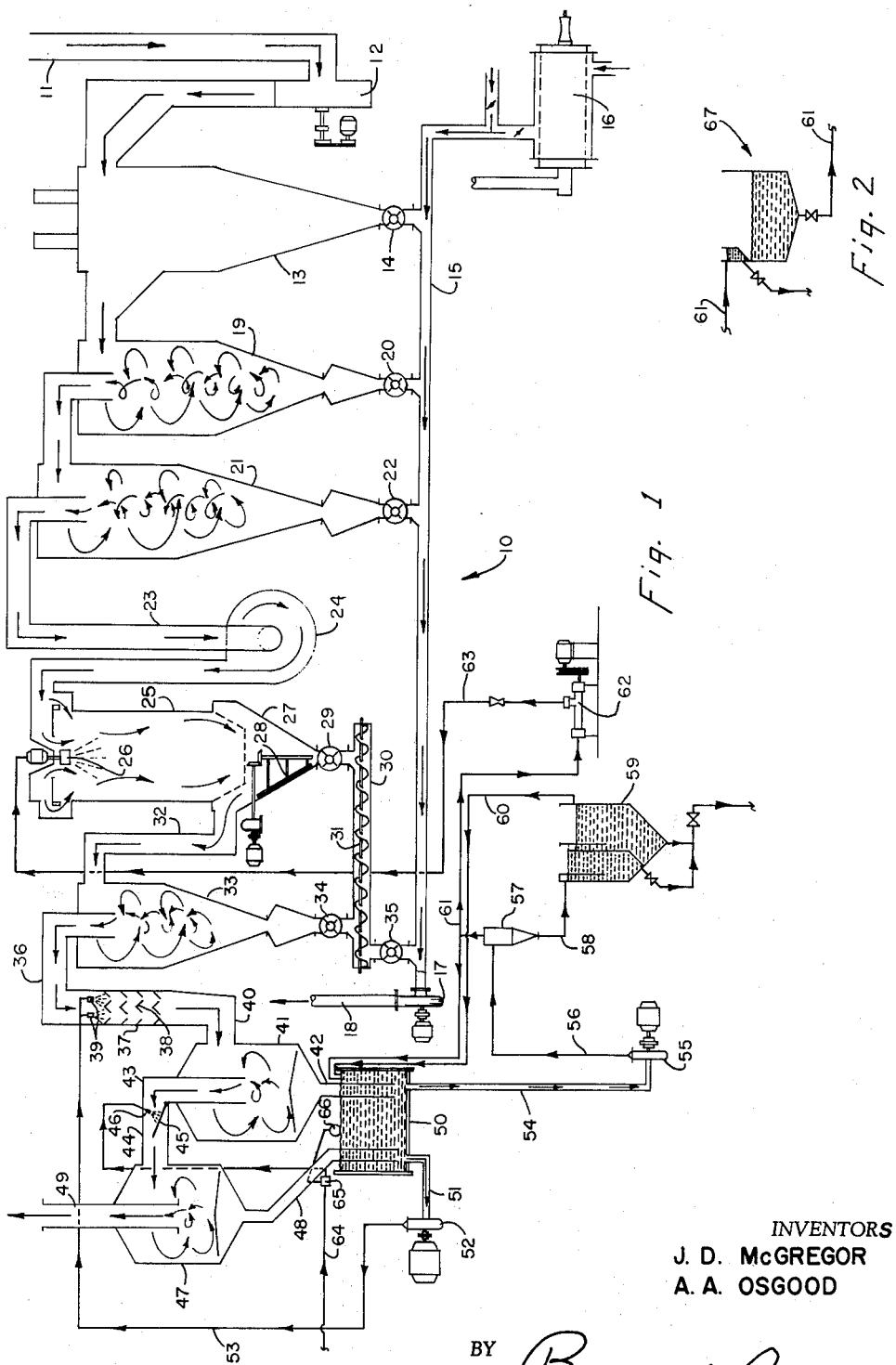
Aug. 31, 1965    J. D. McGREGOR ETAL    3,203,156
CARBON BLACK COLLECTING SYSTEMS
Filed Feb. 5, 1962
INVENTORS
J. D. McGREGOR
A. A. OSGOOD
BY Brown & Rosen United States Patent Office 3,203,156
Patented Aug. 31, 1965

The present invention relates to a carbon black collecting system for use with carbon black producing apparatus of the furnace type.

The primary object of the invention is to provide a wet collecting system for effectively removing carbon black particles from the combustion gases of a carbon black furnace.

Carbon black furnaces, such as that illustrated in Patent No. 2,625,466 issued January 13, 1953, have required collection systems for removing the carbon black particles from the combustion gases, such as the bag filter illustrated in this patent or the dry collecting system illustrated in Patent No. 2,746,564 issued May 22, 1956. Bag filters, while effectively removing the carbon black from the combustion gas stream, are expensive to maintain and require expensive replacements at relatively short intervals. Furthermore, failure of the bag filter due to breaks in the bag permit the exhausting of the combustion gases with carbon black entrained therein with a resulting air pollution. Dry collecting system like that of Patent 2,746,564 fail to remove all of the carbon black particles entrained in the combustion gases exhausted from the furnace and, hence, permit air pollution and an economic loss of carbon black.

Another object of the invention is to provide a wet secondary carbon black collecting system operating in series with a conventional dry collecting system to collect the carbon black particles from the combustion gases not collected by the dry collecting system.

A further object of the invention is to provide a wet secondary collecting system of the type described above in which the hot combustion gases are used to dry the wet collected carbon black particles.

Other objects and advantages will become apparent in the following specification when considered in light of the attached drawings in which:

FIGURE 1 is a semidiagrammatic illustration of the system of the invention;

FIGURE 2 is a semidiagrammatic view of a modified form of the invention illustrated in FIGURE 1.

Referring now to the drawings in detail wherein like reference characters indicate like parts throughout the several figures, the reference numeral 10 indicates generally a carbon black collecting system constructed in accordance with the invention.

In the system 10 a conduit 11 extends from a carbon black furnace of the type illustrated in Patent No. 2,625,466 and the hot combustion gases therefrom flow into the conduit 11 after passing through a cooling tower (not shown). A blower 12 is positioned in the conduit 11 for delivering the combustion gases to an electrical precipitator 13 of conventional design. A portion of the carbon black particles in the combustion gases are removed by the electrical precipitator 13 and are delivered through a rotary gastight valve 14 into a pneumatic conveyor 15 positioned thereunder. An inert gas furnace 16 delivers hot air to one end of the pneumatic conveyor 15, and a pump 17 at the opposite end of of the pneumatic conveyor 15 pumps air and carbon black particles from the pneumatic conveyor 15 through a discharge pipe 18 to the processing equipment for the carbon black.

The combustion gases pass from the electric precipitator 13 to a primary cyclone 19 positioned adjacent thereto. The cyclone 19 has an airtight rotary discharge valve 20 at its lower end for delivering carbon black from the primary cyclone 19 to the pneumatic conveyor 15. The combustion gases pass from the primary cyclone 19 into a secondary cyclone 21 positioned adjacent thereto. A rotary airtight valve 22 connects the bottom of the secondary cyclone to the pneumatic conveyor 19 for delivering carbon black from the secondary cyclone 21 to the pneumatic conveyor 15. The combustion gases pass from the secondary cyclone 21 through a conduit 23 to a blower 24. The blower 24 assists in moving the combustion gases from the secondary cyclone 21 to a spray dryer scrubber 25 arranged adjacent thereto. With the exception of the spray dryer scrubber 25, the apparatus described above comprises a dry primary collecting system of conventional construction found on many carbon black furnaces.

The spray dryer scrubber 25 is a conventional spray dryer of the type illustrated in U.S. Patents 2,698,815 and 2,921,383. Spray dryers of this type use a high speed motor driven atomizing wheel which atomizes the incoming fluid. The hot air moves concurrently downwardly in the spray dryer with the atomized fluid.

The present secondary wet collecting system begins with the spray dryer scrubber 25 and operates in series with the above-described apparatus to remove carbon black from the combustion gases which was not removed by the primary dry collecting system. In practice, up to 34% of the carbon black still remains in the combustion gases after the gases have passed through the primary dry collecting system.

The spray dryer scrubber 25 includes a rotary slurry atomizing spray head 26 which sprays carbon black slurry downwardly in the spray dryer scrubber 25 concurrent with the combustion gases which are also passing downwardly therethrough. As the gas enters the spray dryer scrubber, it is forced through a fine spray of carbon black slurry from the spray head 26. The dry carbon black in the gas stream impinges and adheres to the small carbon black droplets in the slurry spray and, in turn, makes larger and heavier droplets. These droplets fall through and are surrounded by the hot gas stream which dries them to form heavier carbon black particles that can be collected at the spray dryer scrubber collecting hopper 27. The collecting hopper 27 is provided with a rotary scraper 28 and opens through an airtight rotary valve 29 into a conveyor 30 having a spiral ribbon conveyor blade 31 rotatably mounted therein.

The gas stream from the spray dryer scrubber 25 passes through a conduit 32 and carries with it a large percentage of the particles of carbon black not collected in the collector hopper 27. The gas stream and carbon black particles pass through the conduit 32 to a tertiary cyclone 33. A rotary airtight valve 34 on the bottom of the tertiary cyclone 33 feeds carbon black from the tertiary cyclone 33 into the conveyor 30. An airtight rotary valve 35 connects one end of the conveyor 30 with the pneumatic conveyor 15.

A conduit 36 leads from the top of the tertiary cyclone 33 and connects to the upper end of a scrubber 37 positioned adjacent to the tertiary cyclone 33. The scrubber 37 has a plurality of baffle plates 38 positioned therein and is further provided with slurry spray heads 39 positioned above the baffles 38. The combustion gases passing from the tertiary cyclone 33 through the conduit 36 are further scrubbed in the scrubber 37 by the slurry so that even extremely light particles of carbon black are removed from the gas stream. The scrubber 37 exhausts through a conduit 40 into a primary wet cyclone 41 positioned adjacent thereto. The primary wet cyclone 41 separates the slurry droplets from the gas stream and discharges the slurry droplets through a pipe 42 on the lower end thereof. The gas stream passes upwardly through a conduit 43 leaving the primary wet cyclone 41 and passing into a horizontal conduit 44. A baffle plate 45 is positioned in the horizontal conduit 44 and has a fresh water spray head 46 arranged in the horizontal conduit 44 to spray thereagainst.

The horizontal conduit 44 extends to a secondary wet cyclone 47 wherein the final separation of slurry droplets and gas stream occurs, with the slurry droplets being discharged through a pipe 48 and the gas stream being discharged to the atmosphere through a flue 49.

A slurry tank 50 is positioned beneath the primary wet cyclone 41 and the secondary wet cyclone 47 and the pipes 42, 48 extend into the slurry tank 50 terminating at a point just above the bottom of the slurry tank 50. A pipe 51 extends from the bottom of the slurry tank 50 to an electric motor driven pump 52. A pipe 53 extends from the electric motor driven pump 52 to the fresh water spray heads 39 in the scrubber 37. A pipe 54 also extends from the bottom of the slurry tank 50 and connects to an electric motor driven pump 55. The pipe 56 extends from the pump 55 and discharges into a liquid solid separator cyclone 57 to remove grit from the slurry. The underflow from the cyclone 57 passes through a pipe 58 to a settling tank 59. The overflow of the settling tank 59 passes back to the slurry tank 50 through a pipe 60. The overflow of the cyclone 57 passes into a pipe 61 and a portion of the flow returns to the slurry tank 50 while another portion of the flow passes to an electric motor driven pump 62. A pipe 63 extends from the pump 62 to the spray head 26 in the spray dryer scrubber 25. A fresh water line 64 is provided with a float-controlled valve 65 with the float 66 thereof floating on the surface of the slurry in the slurry tank 50. The pipe 64 controlled by the float-control valve 65 feeds fresh water to the spray head 46.

In FIGURE 2, a modified form of the invention is illustrated wherein a settling tank generally indicated at 67 is positioned in the flow line 61 between the liquid solid separator cyclone 57 and the electric motor driven pump 62. The settling tank 67 functions to remove additional grit and impurities while at the same time assisting in concentrating the slurry.

In the normal operation of the dry collection system, including the electrical precipitator 13, primary cyclone 19, and secondary cyclone 21, up to 34% of the carbon black particles in the combustion gases are not collected and pass outwardly therefrom through the conduit 23. In applicants' wet collecting system described above, the spray dryer scrubber utilizes a slurry spray into which a large quantity of the carbon black particles are entrained and then by utilizing the heat of the combustion gases at least partially dries these agglomerated particles. A good percentage of the particles are collected in the collector hopper 27 and pass through the valve 29 into the conveyor 30, while some of these particles pass with the combustion gases into the tertiary cyclone 33 where they are collected to pass through the valve 34 into the conveyor 30. The combustion gases passing out of the tertiary cyclone 33 have only extremely light particles of carbon black contained therein and the scrubber 37 entrains the greater majority of the remaining particles in the slurry which is collected in the primary wet cyclone 41 and discharged into the slurry tank 50. The remaining combustion gases pass through a fresh water spray from the fresh water spray head 46 so that any remaining carbon black particles are effectively scrubbed from the combustion gas and are removed through the secondary wet cyclone and are discharged into the slurry tank 50.

Since the system will develop a rather constant evaporation rate, the flow through the spray heads 46 will be relatively constant but is controlled by the float 66 and the float-control valve 65 to maintain a constant water level in the system.

It should be understood that while applicants have disclosed a spray dryer scrubber having concurrent flow of the combustion gases and the sprayed slurry, other conventional spray dryer scrubbers may be used in which countercurrent flow of the combustion gases and slurry is utilized. It should be also understood that the spray head 26 may be of any conventional type including spray discs, spray wheels, and high pressure nozzles.

Having thus described the preferred embodiments of the invention, it should be understood that numerous structural modifications and adaptations may be resorted to without departing from the scope of the appended claims.

1. A carbon black collecting system for carbon black furnaces comprising a spray dryer scrubber, means for conducting combustion gasses from a carbon black furnace to the top of said spray dryer scrubber, means including a rotary atomizing spray head for spraying carbon black slurry into said scrubber adjacent the top thereof, said spray dryer scrubber entraining carbon black particles in said combustion gas into slurry droplets which are dried in said spray dryer scrubber forming carbon black particle agglomerates, means adjacent the bottom of said spray dryer scrubber for collecting and discharging a portion of said carbon black agglomerates, a gas outlet adjacent the bottom of said spray dryer scrubber, a cyclone positioned adjacent said spray dryer scrubber, means connecting said spray dryer scrubber to said cyclone for conducting the exhaust combustion gases from said spray dryer scrubber to said cyclone, said cyclone having carbon black particle agglomerate collecting and discharging means for removing remaining carbon black particle agglomerates from said combustion gases, said combustion gases and said sprayed carbon black slurry moving concurrently downwardly in said scrubber, a baffle plate scrubber positioned adjacent said cyclone, mean for conducting exhaust gases from said cyclone to said baffle plate scrubber, a primary wet cyclone, a secondary wet cyclone, said primary and secondary wet cyclones positioned adjacent said baffle plate scrubber, means for conducting the gases from said baffle plate scrubber to said primary wet cyclone and from said primary wet cyclone to said secondary wet cyclone, said primary and said secondary wet cyclones being adapted to produce a carbon black water slurry, means for collecting said carbon black water slurry and means for pumping said carbon black water slurry from said collecting means to said rotary atomizing spray head in said spray dryer scrubber.

2. A system as claimed in claim 1 wherein the means for conducting combustion gases from a carbon black furnace to said spray dryer scrubber includes a dry carbon black collecting system.

3. A device as claimed in claim 1 wherein the means adjacent the bottom of said spray dryer scrubber for collecting and discharging a portion of said carbon black agglomerates includes a pneumatic conveyor and means connecting said spray dryer scrubber to said pneumatic conveyor for transferring carbon black agglomerates from said spray dryer scrubber to said pneumatic conveyor.

(References on following page)

References Cited by the Examiner

UNITED STATES PATENTS

| | | | |
|---|---|---|---|
| 1,264,511 | 4/18 | Hechenbleikner | 55—122 |
| 1,766,588 | 6/30 | Bassler | 261—89 |
| 1,979,189 | 10/34 | Bowers | 55—223 |
| 2,142,406 | 1/39 | Nonhebel et al. | 55—228 |
| 2,368,828 | 2/45 | Hanson et al. | 55—257 |
| 2,677,439 | 5/54 | Hedberg | 55—94 |
| 2,698,815 | 1/55 | Bishop | 117—100 |
| 2,746,564 | 5/56 | Williams | 55—94 |
| 2,776,725 | 1/57 | Wood | 55—124 |
| 2,921,383 | 1/60 | Bassler | 261—89 |
| 2,938,599 | 5/60 | Nagelkerke et al. | 55—94 |
| 2,967,588 | 1/61 | Swart | 55—94 |

FOREIGN PATENTS

| | | |
|---|---|---|
| 743,172 | 1/33 | France. |
| 396,159 | 5/24 | Germany. |

HARRY B. THORNTON, *Primary Examiner.*

HERBERT L. MARTIN, *Examiner.*